US011126660B1

(12) United States Patent
Sen et al.

(10) Patent No.: US 11,126,660 B1
(45) Date of Patent: Sep. 21, 2021

(54) HIGH DIMENSIONAL TIME SERIES FORECASTING

(71) Applicant: A9.com, Inc., Palo Alto, CA (US)

(72) Inventors: Rajat Sen, Austin, TX (US); Hsiang-Fu Yu, San Jose, CA (US); Inderjit Dhillon, Berkeley, CA (US)

(73) Assignee: A9.COM, INC., Palo Alto, CA (US)

( * ) Notice: Subject to any disclaimer, the term of this patent is extended or adjusted under 35 U.S.C. 154(b) by 322 days.

(21) Appl. No.: 16/206,655

(22) Filed: Nov. 30, 2018

(51) Int. Cl.
*G06F 16/9032* (2019.01)
*G06N 3/08* (2006.01)

(52) U.S. Cl.
CPC ......... *G06F 16/90324* (2019.01); *G06N 3/08* (2013.01)

(58) Field of Classification Search
CPC ............................ G06F 16/90324; G06N 3/08
USPC .......................................................... 707/767
See application file for complete search history.

(56) References Cited

U.S. PATENT DOCUMENTS

| 10,474,950 | B2* | 11/2019 | He | G06N 3/049 |
|---|---|---|---|---|
| 2017/0097939 | A1* | 4/2017 | Zhu | G06F 16/90324 |
| 2017/0270435 | A1* | 9/2017 | Gallardo | G06N 3/08 |
| 2017/0315523 | A1* | 11/2017 | Cross | G05B 17/02 |
| 2018/0144466 | A1* | 5/2018 | Hsieh | G06T 7/0012 |
| 2018/0219889 | A1* | 8/2018 | Oliner | G06N 3/04 |
| 2019/0080233 | A1* | 3/2019 | Procter | G06N 20/00 |
| 2019/0325302 | A1* | 10/2019 | Savic | G06F 9/44505 |
| 2020/0133489 | A1* | 4/2020 | Martin | G06F 3/0607 |

OTHER PUBLICATIONS

Non-Patent Literature: "Temporal Regularized Matrix Factorization for High-dimensional Time Series prediction;" Hsiang-Fu Yu, Nikhil Rao, Inderjit S. Dhillon; 2016; Barcelona.*

\* cited by examiner

*Primary Examiner* — Giovanna B Colan
(74) *Attorney, Agent, or Firm* — Hogan Lovells US LLP (57) ABSTRACT

Large scale time series forecasting models are described that leverage deep learning. This can include the utilization of temporal convolution networks and long short-term memory (LTSM) units of recurrent neural networks (RNNS). The model architectures can handle very large data sets with a large number of time series. Diverse scaling is provided through use of a scale-free leveling network architecture, and sparse time-series data is managed using a gating approach. A deep temporally regularized matrix factorization approach to time-series forecasting is utilized that can leverage correlations between the time series during both training and prediction.

20 Claims, 8 Drawing Sheets

FIG. 1

Received partial query: knee length

Autocomplete suggestions:
knee length dress
knee length blue dress
knee length petticoat
knee length boots for women
knee length black skirt
knee length socks
...

FIG. 2

Keyword Frequency Predictions:
black      94658
blue       35630
length    13562
dress     1001
socks      932
...

HIGH DIMENSIONAL TIME SERIES FORECASTING

BACKGROUND

Users are increasingly consuming content electronically, such as by accessing digital content provided over the Internet or another such network. Due in part to the large amount of user traffic experienced over time, it can be advantageous in many situations to be able to predict user behavior for an upcoming period of time. Accurate predictions can help to customize the experience for those users, as well as to prepare for the traffic or adjust the content that will be available, among other such actions. The time component, along with the large volume of data available, can make such predictions inaccurate and expensive to obtain.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to predicting user behavior in an electronic environment. In particular, various embodiments provide large scale time-series forecasting models that leverage deep learning. In some embodiments, temporal models including temporal convolution networks or long short-term memory (LTSM) units of recurrent neural networks (RNNS) are utilized. The model architectures can handle very large data sets with a large number of time series. Diverse scaling is provided through use of a scale-free leveling network architecture, and sparse time-series data is managed using a gating approach. A deep temporally regularized matrix factorization approach to time-series forecasting is utilized that can leverage correlations between the time series during both training and prediction.

Various other functions can be implemented within the various embodiments as well as discussed and suggested elsewhere herein.

Forecasting several possibly-correlated time series over future periods of time, also referred to as time steps, is a crucial problem in several real world applications. These applications include, for example, demand forecasting and financial time series prediction, among others. In the context of electronic commerce, for example, relevant applications include item demand forecasting for an electronic marketplace, as well as demand prediction for servers to provide for the transactions for the item demand. Approaches discussed herein provide robust and scalable deep models for large-scale time series forecasting, as may be advantageous for applications such as content location and search.

When developing models for large-scale time series problems, it should be noted that these models in at least some embodiments should be scalable to large datasets containing hundreds of millions of time series or more. It can also be desirable for such models to be able to handle non-linear temporal dependencies. Linear auto-regressive and state-space models, such as may include vector auto-regression (VAR), autoregressive moving average (ARMA), and autoregressive integrated moving average (ARIMA) models, have been historically popular in modeling time series, but these models are not adequate to handle non-linear temporal dependence for large datasets. Moreover, these models need to be trained separately for each time series in question and therefore are not that scalable to very large datasets. Deep learning models are a reasonable choice for modeling non-linear dependencies, and have been used in the context of time series forecasting. Common building blocks for modeling long-term temporal dependencies are Long Short Term Memory (LSTM) units, which have been widely used in sequence-to-sequence language models, as well as in time series prediction. Another reasonable alternative for modeling temporal dependencies involves the use of causal convolutional networks with dilation, which provides for the capture of a large dynamic range. Such approaches can be combined and utilized as discussed herein to provide various advantages.

In some embodiments, a leveling network can be utilized. One of the major hindrances for training deep learning models on large time series data sets is that different time series may have different scales. The difference in scales can lead to training instability. The differences can be managed in some embodiments by normalizing the training set. It can be difficult, however, to choose the correct scaling factor, and an incorrect scaling factor can have a severe, negative impact on performance. A leveling network architecture as discussed herein can help to neutralize the need for any pre-normalization, and can lead to more accurate forecasting. A gating network can also be used in various embodiments. Large time series data sets may have a significant number of tail time series, which may appear as sparse arrival processes. That is to say that many of the entries are zeroes, with intermittent non-zero entries. This may lead to a loss of accuracy in the trained deep learning models. A gating network can be used that can explicitly model sparse time series, and therefore can help to alleviate such issues. A deep, temporally-regularized matrix factorization approach can also be used for time series forecasting in at least some embodiments. Such an approach can leverage correlations between all the time series, during both training and prediction.

Figure 1:
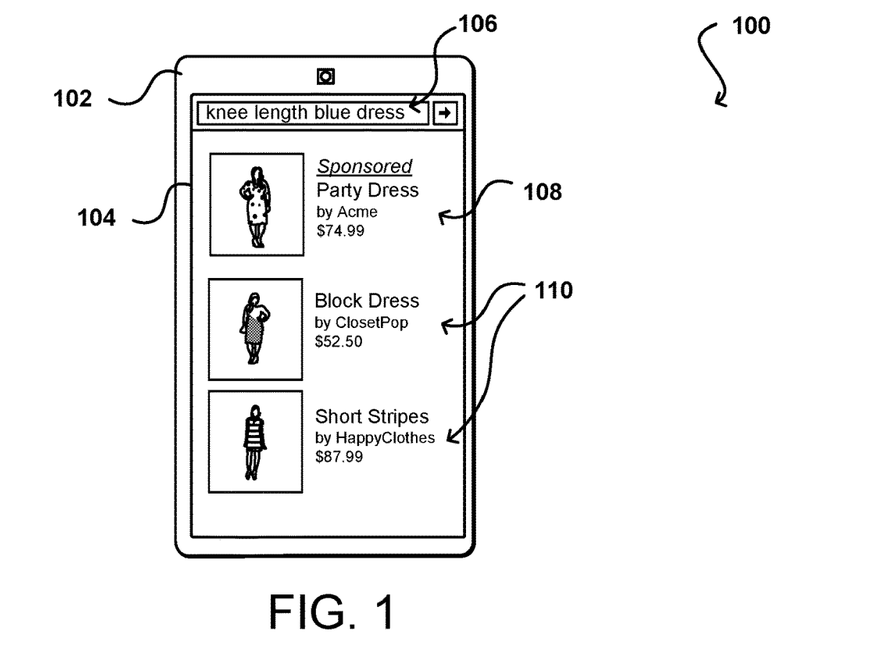
FIG. 1 illustrates an example selection of content that can be provided in response to receiving a search query in accordance with various embodiments.

As mentioned, the ability to provide accurate time series forecasting can be beneficial for various applications. As an example, such an approach can help to determine accurate auto-completion suggestions for received search queries. FIG. 1 illustrates an example interface state 100 wherein content is displayed on a display 104 of a portable computing device 102. It should be understood that any appropriate device and mechanism for displaying content can be used as well within the scope of the various embodiments. In this example, a user has entered a search query 106 into an appropriate interface field, which has caused a set of search results 110 to be displayed, where each of the search results is determined to be at least somewhat relevant to the received query.

In order to improve the user experience, it can be beneficial to assist the user in entering the appropriate query. This can include, for example, analyzing the characters or keywords entered into the search box, for example, and then attempting to determine the query that the user is attempting to enter. This can either be a query that the user is in the process of entering, or a query that might be helpful to the user in locating the desired content based on the characters already entered into the search box, among other such options. If a query can be determined with 100% accuracy then the query can be completed automatically. In many situations, however, one or more queries will be determined to be candidates for completion with respective confidence values or rankings (i.e., less than 100% confidence), based on queries that have been received previously for this user, or other users. These queries can then be suggested to the user, whereby selection of one of the suggested queries can cause that query to be selected and executed, with new or updated search results provided for display.

Figure 2:
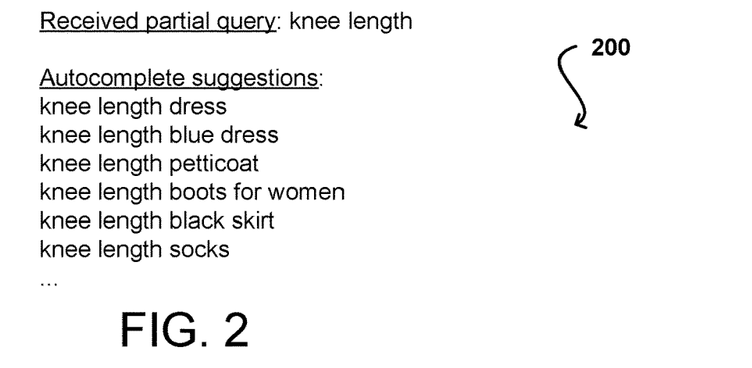
FIG. 2 illustrates example auto-completion suggestions that can be generated accordance with various embodiments.

FIG. 2 illustrates an example situation 200 wherein a user has entered a (potentially) partial query "knee length." In order to help the user enter a useful query, the system can attempt to determine queries that have a likelihood of being entered based in part upon this query prefix. As illustrated, a set of potential queries can be determined that start with the query prefix. If one of these queries is of interest to the user, or is the query the user is attempting to enter, the user can select the appropriate query as discussed herein. This can cause that query to be executed and search results to be displayed, as illustrated in FIG. 1. In some embodiments the possible queries that match the prefix are determined and ranked, with a subset of the highest-ranked queries being selected for presentation. A set of ranked queries for the provided prefix are displayed in FIG. 2. The order in which the matching queries are ranked can be important for enhancing the user experience, as well as for increasing the likelihood of a sale or corresponding transaction. In some embodiments the ranking can be at least partially based on predicted attributes of a query q, such as the predicted daily session rate. A session rate can correspond to a fraction or ratio of times that a given query is searched among all received queries. The daily purchase rate can also be utilized, which can represent the average number of times a product is purchased owing to that query on a given day. Another factor can be the expected revenue or average money value generated from that query on a given day. Given historical data for these attributes for a time series $t=1, 2, \ldots, t_0$, a task can be to predict the value for the next day. For instance given the session rate values, the task can be to predict the session rate on day $t_0+1$. Once these predicted values are obtained, the queries on that day can be ranked according to a selected ranking function. In an example session rate data set there might be ninety days of historical data for prediction at any given time, with the number of queries reaching into the hundreds of millions. The task at hand can therefore be to forecast more than a hundred million possibly correlated time series for k days into the future, where k can be a single day ahead or possibly a week or two ahead, among other such options.

Figure 3:
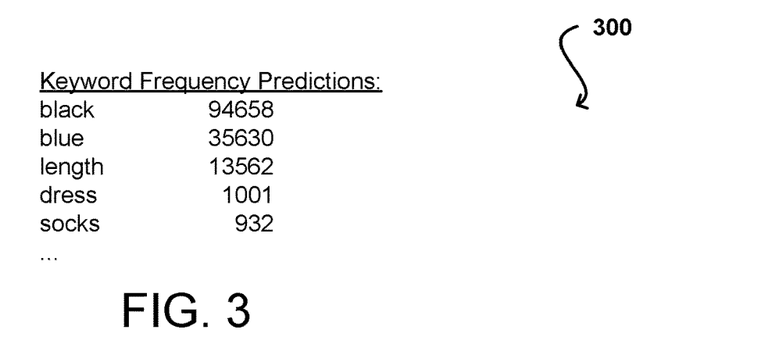
FIG. 3 illustrates example keyword frequency predictions that can be generated in accordance with various embodiments.

Another application for these predictions relates to the predicted frequency with which specific keywords will be received in search queries over a future period of time. As an example, a retailer of dresses might want to purchase sponsored keywords that relate to the retailer's products. For example, returning attention to FIG. 1 a retailer of dresses might purchase the keyword "dress" for a period of time, whereby a query received that includes that keyword can cause content 108 for an item specified by that retailer to be displayed in a specific location or with a specific prominence, for example, such as at a sponsored result location at the top of the list of search results. In this way, a retailer can pay to ensure that their content is displayed to various users submitting queries including a specific keyword, or set of keywords, for which the retailer has provided some type of compensation to a content or search provider. In order to determine which keywords to purchase, as well as the appropriate price, the retailer might want to determine the frequency or number of expected occurrences of each keyword over an upcoming period of time. As illustrated in the situation 300 of FIG. 3, the retailer might be able to obtain a list of keywords determined to be relevant to a particular item, and also receive the frequency or number of appearances of those keywords in received queries for a future period of time. The retailer can use this information to determine which, if any, of the keywords to sponsor, as well as the corresponding price and period of time in at least some embodiments. In some embodiments, the volume of traffic for various keywords is forecasted on a daily basis, which can result in hundreds of millions of keywords and the same number of correlated time series to be calculated.

In various embodiments, an attempt can be made to forecast n time series, where n can be on the order of 100 million or more. Recurrent Neural Networks (RNNs) have been popularly used for modeling in sequence-to-sequence models. These models are basically non-linear generalizations of linear hidden state space models, and therefore can be used for modeling time series data. However, due to gradient exploding and/or vanishing issues during training, RNNs can fail to capture long-term temporal dependencies. LSTMs are generalizations of the RNN architecture, which can effectively model long-term temporal dependencies. Various approaches can then be taken for modeling and predicting time-series using LSTMs. In one embodiment, a goal is to have one high-capacity LSTM model that captures the common patterns of all the n time series as well as possible. A multi-layer LSTM block can be denoted by the function L(.). The modelling assumption is that each time series can be expressed by the a set of non-linear state space equations, which include the hidden state of the LSTM for time series i and time index t. At least time step the values if the time series is an affine function (matrix A) of the hidden state of the LSTM at that time, while the hidden state is a function of the previous hidden state, the value of the time-series in the previous time-point and the value of the covariates at that time-point.

In an example training process, Stochastic Gradient Descent (SGD) using mini-batches can be used to train the network components. In at least some embodiments, the final hidden state at the end of one mini-batch should be used as the starting hidden state for the next mini-batch in each horizontal pass. The error function that is commonly used is the Mean Squared Error (MSE) in a mini-batch. After the model has been trained it can be used for multi-step look-ahead prediction given the past value of any time series. For example, given a sequence the next two time-points can be predicted by feeding the outputs back as subsequent inputs.

A causal convolution architecture with dilation can be utilized in at least some embodiments. For time-series forecasting, the value of a time-series at time t can be represented as a one-dimensional convolutional function of values at prior time-points. The number of time-points on which the current value is assumed to depend on is known as the dynamic range of the architecture. Important design parameters for a causal convolution architecture include the number of layers 1, the filter size or kernel size, the number of filters in each layer, and the dilation at each layer. The dilation is the number of connections skipped by each filter, and in one example can be set to be $d(r)=2^{r-1}$. A choice to increase dilation can be made as the network can have an exponentially-increasing dynamic range with the number of layers, even though it uses relatively fewer parameters than a fully connected layer. Let m(r) denote the dynamic range of a causal convolution network with r layers, leading to the relation:

$$m(r)=m(r-1)+(k-1)d(r)$$

where k is the kernel size. Such architectures also support residual connections, in order to alleviate the vanishing gradient problem for deep architectures. If the network in a causal convolutional model has a dynamic range of m, the modeling assumption is that the time-series in the data-set can be represented by an auto-regressive equation, and the network can be trained by SGD in mini-matches.

As mentioned, a leveling network can be utilized for dealing with diverse scales in the time-series datasets. For simplicity all the modifications will be described in terms of LSTM based models, and the co-variates can be ignored. However, the proposed architectural changes can also be applied to causal convolution-based architectures in a fairly straight-forward manner. In large-scale time series data sets containing millions of time-series, there may be very diverse time-series in terms of scale. For instance, in an example session rate dataset many queries have very few searches per day, while some common keywords may be searched hundreds of thousands of times per day. These scaling issues can lead to issues in model training, such as where the basic LSTM model is naively trained and then converges to predicting an average value of each time-series without capturing any temporal variation. A simple way to deal with such scaling issues is normalize each time-series in the training set by a scalar scaling factor $s^{(z)}$. However, the choice of the scaling factor is crucial in at least some embodiments. In at least these embodiments, a scale free architecture can be utilized for time series prediction, which removes the need for any such scaling. A hierarchical prediction model can be used, where based on the previous time points one can predict the average value of the time series for the next w time-points (a moving average of future values). Given this prediction, another network component can predict the additive variation from the average value predicted per time-step. The intuition is that the prediction of the slowly varying window average for future w time-steps is a much easier prediction problem and can be handled without any scaling issues. Further, given this window average the additive variations from this level are scale-free. The leveling network can be used to predict the average value for the next w time-points. A network can also predict the per-step time step additive variation around the value predicted by the previous network. Multi-step prediction can be done by feeding back the outputs as subsequent inputs. Using the leveling approach, time-series networks can be trained on a variety of different data-sets without the need for normalization.

A gating network can also be used in at least some embodiments to address sparse time series. Time-series datasets, like demand forecasting datasets, may have a majority of the time series that are sparse arrival processes with intermittent non-zero entries. Such time series are referred to herein as tail time-series, while other time-series which look like real valued temporal processes are referred to as head time series. If LSTM models are trained on these datasets without explicitly modeling this issue then the predictions may be biased towards zero. Therefore, it may be beneficial to model such behavior explicitly. A gating network can be used to model such behavior. An additional LSTM block can be added which shall function as the gating network. The network is trained to detect whether the value of the time-series in question is zero or non-zero at the current time-step, given the past data. The networks can be trained by performing SGD on their respective loss functions. The outputs of the gating and the leveling network are assumed to be constant while performing SGD on the loss for the LSTM. Note that when the gating network predicts the next value to be zero, no gradient update takes place for the network. Therefore, these networks do not get biased by the majority of sparse tail time-series.

In one embodiment, the network components may be LSTM blocks or causal convolutional blocks. Input batches can be are fed sequentially to the three network components. The outputs of the networks and the output batch are together used to calculate loss functions for each individual network. Then each of the network components can be trained through SGD on their respective loss functions. An example training algorithm for mini-batches, for up to the number of iterations, gets the input and out mini-batches, and for each of the three networks does a forward pass. The respective losses can be obtained, and SGD performed on each of the networks with the respective losses, keeping everything else constant. Similarly, for the multi-step prediction methodology, the past data for a batch of time-series can be fed to all three networks. The outputs of the various components can be combined to get the prediction for the next step. This can then be appended back to the input and fed back to the network to predict two steps ahead. This methodology can be repeated for multiple steps Some embodiments can also take advantage of deep Temporally Regularized Matrix Factorization (TRMF). In an approach discussed above, one model is trained to capture the common patterns of all the time-series in the training set. While predicting each time series, however, only the past values of that time-series are used, ignoring the co-variates. Even during prediction it may be beneficial to look at the values of other possibly correlated time-series. As an example, in a session rate data set there may be queries leading to similar products that have similar temporal trends and daily patterns. A two-dimensional convolutional architecture can be utilized that takes as an input all the time-series and outputs the one-step look-ahead output of all the time series. Such a model, however, can only handle a number of time-series of the order of ten thousand in one example, as the number of parameters in the input layers will explode otherwise.

Figure 4:
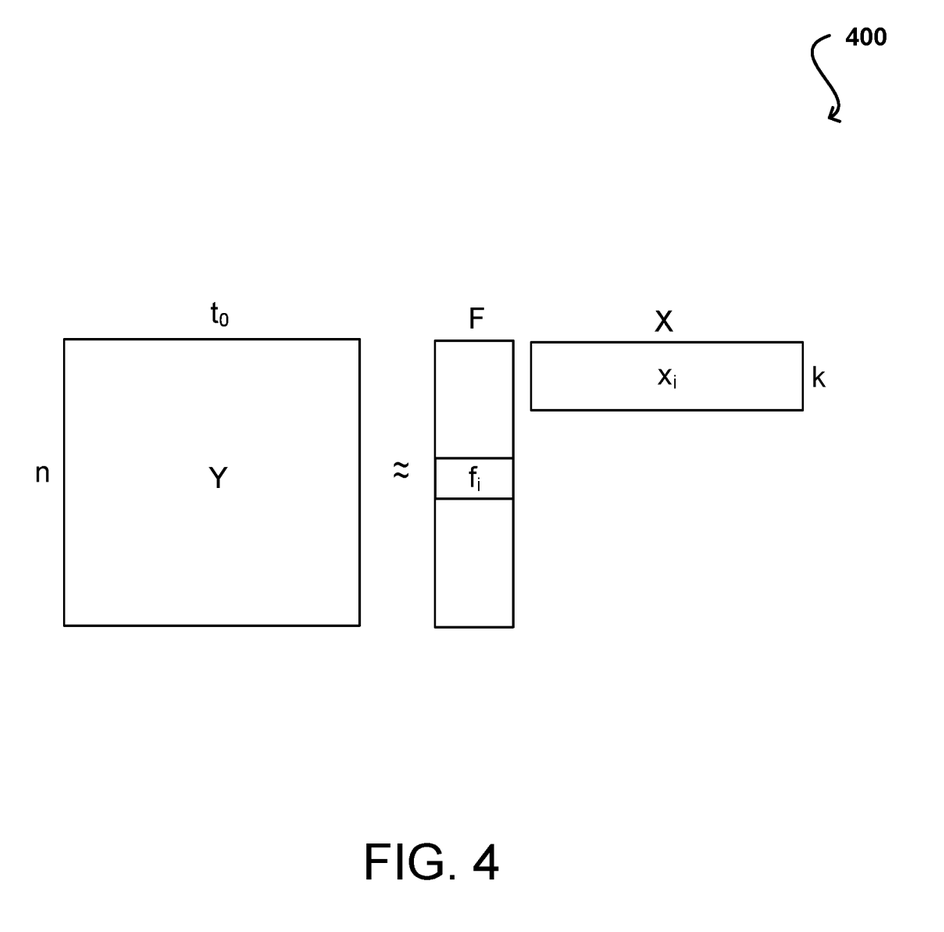
FIG. 4 illustrates an example temporally regularized matrix factorization model that can be utilized in accordance with various embodiments.

In one embodiment, a matrix factorization approach can be utilized through temporal regularization. The idea is to factorize the training data set such that each original time-series can be expressed as a linear combination of a k basis time-series, where k is the factorization rank. FIG. 4 illustrates one such example linear combination 400 that can be utilized in accordance with various embodiments. The n time-series are represented as the matrix Y. This matrix is factorized into factors $F(n \times k)$ and $X(k \times t_0)$. The matrix X represents the k basis time-series. A temporal auto-regressive regularization approach can be utilized to encourage the basis time-series matrix X to have temporal relations. The loss can be minimized as a function of the parameters F, W and X through conjugate gradient descent or SGD. After obtaining the factors, future time steps can be predicted by forecasting the temporal factor $\{x_t\}$ into future time-steps using the auto-regressive model. Then the original time-series can be obtained by multiplying by the factor F.

A natural modification can be made to the TRMF approach. In TRMF the regularization encourages a linear auto-regressive nature on the temporal component X. In one example model this regularization can be modified by utilizing a deep model that can model non-linear temporal relations. For example, a causal convolutional architecture can be used for this purpose. The factors F and W are alternatively trained by mini-batch SGD along with the network. An additional hyper-parameter η can be added that can be tuned through cross-validation. Techniques discussed above can be used to make the network scale-free. After recovering the factors F and X in the training set, future values of the temporal factors can be predicted using the network over multiple time-steps. These values can be multiplied by the factor F to recover the original time-series, over future time-steps.

A potential drawback to using such a model is that the model may need to be retrained every time new data is encountered for one-step look-ahead predictions. That is, if one more time-step $t_0+1$ is observed for all the time-series in the dataset, the model needs to be retrained to generate the new temporal column vector $x_t+1$. A modification to the above model can be performed that can provide for improved capture of local temporal patterns, while not requiring retraining when new data is observed. An approach in accordance with one embodiment introduces an additional causal convolutional network $T^f$ that predicts a temporally-varying F matrix for future time-steps. Given past data for a time-series, the network $T^f$ generates a vector $f_i(t)$ of dimension k, which is intended to be the temporally varying multiplying factor for time-series i. The components are trained alternatively by mini-batch SGD on their respective loss functions. While training any one component, the others can be assumed to be constant parameters.

Figure 5:
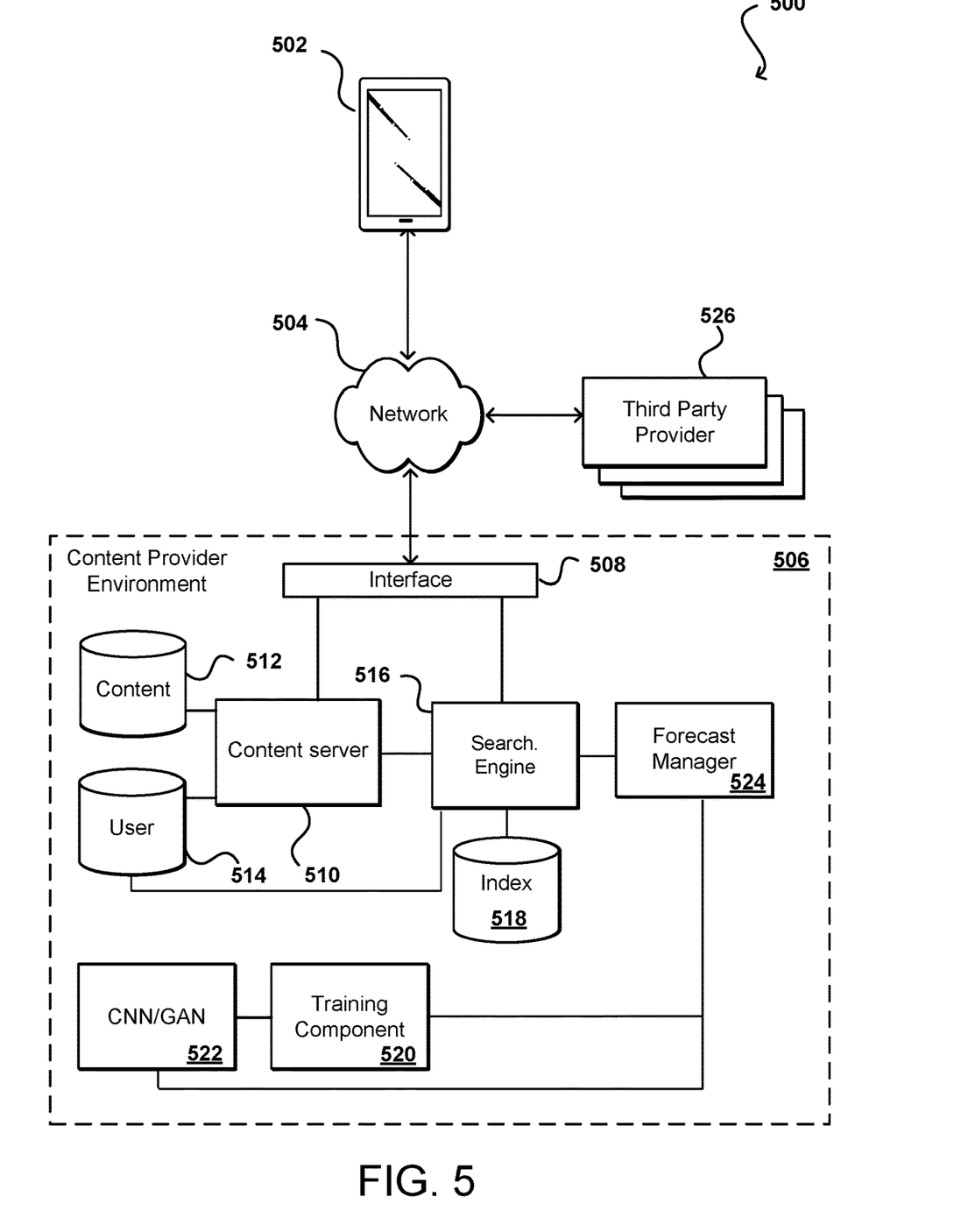
FIG. 5 illustrates an example system that can be used to implement aspects of the various embodiments.

FIG. 5 illustrates an example environment 500 in which aspects of the various embodiments can be implemented. In this example, a computing device 502, such as a portable computing device of a user, is able to make a call or request across one or more networks 504 to a content provider environment 506. It should be understood, however, that in some embodiments some or all of the functionality may be performed on the computing device itself. The network(s) can include any appropriate network, such as the Internet, a local area network (LAN), a cellular network, an Ethernet, or other such wired and/or wireless network. The content provider environment 506, which can include any appropriate environment in which physical resources such as servers and databases are located and able to serve content, can include various types of resources for providing content from, or at least stored by, a resource provider, or other such entity.

In this example, a request received to the content provider environment 506 can be received by an interface layer 508 of the environment. As known for network environments, the interface layer can include components such as interfaces (e.g., APIs), load balancers, request and/or data routers, and the like. If the request is a request for content, such as for content for a page to be displayed in an application or browser, information for the request can be directed to one or more content servers 510 and/or content managers, which can obtain the content from a content data store 514 or other such repository to be sent back across the network(s) 504 to the computing device 502, or another indicated destination. In some embodiments, information for the request might also be compared against user data in a user data store 512 or other such location do determine, for example, whether the user has access rights to that content. In some embodiments user data might also be analyzed to determine which type of content to provide, additional supplemental content to provide with the primary content, and the like.

In various embodiments, the request may include or specify at least one variable or parameter for which to receive forecast demand data. As mentioned, the variable in some embodiments may relate to future demand for an item, query, keyword, or other type of content. In response to receiving such a request, information for the request can be passed to a forecast manager 524, or other such system or service, that may be part of the environment or offered as a third party service, among other such options. The forecast manager 524 can manage the training of one or more forecasting models (e.g., temporal models) using a large set of historical demand data as discussed herein. The forecast manager can also be responsible for processing the request data using the trained model(s), and providing back the generated demand data in response to the request. As mentioned, in some embodiments third party providers 526 might want to have specific content provided to the client device in response to the received request, or may be associated with the data for which the historical demand is tracked. Accordingly, the third party providers might bid or provide payment to have specific content associated with specific queries or keywords. As mentioned, various approaches discussed herein can be used to determine forecast demand for items or content, which can also be surfaced to the third party providers 526 to assist in determining the appropriate queries for which to provide associated content. Such information can also help to determine a fair amount or rate of compensation based at least in part upon the predictions.

The forecast demand can be determined at least in part using neural networks 522 such as a conventional neural network (CNN) or generative adversarial network (GAN). A training component 520 can perform the training on the models and provide the resulting results and/or trained models for use in determining the individual demand. In order to determine demand for various content items, in at least some embodiments, some analysis of content items in an electronic catalog or other data repository is performed to determine information about the items. In some embodiments, one or more feature descriptors or vectors can be generated to describe various aspects of an item.

A training component 520 can utilize the training data set to train the neural network 522. Neural networks can include several learning layers in their architecture. Data from the training data set is analyzed using the neural network to, in some embodiments, extract a feature vector from the network. In various embodiments, the resulting feature vectors can be compressed for improved processing. For example, the attributes generated by the neural network may include feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 6:
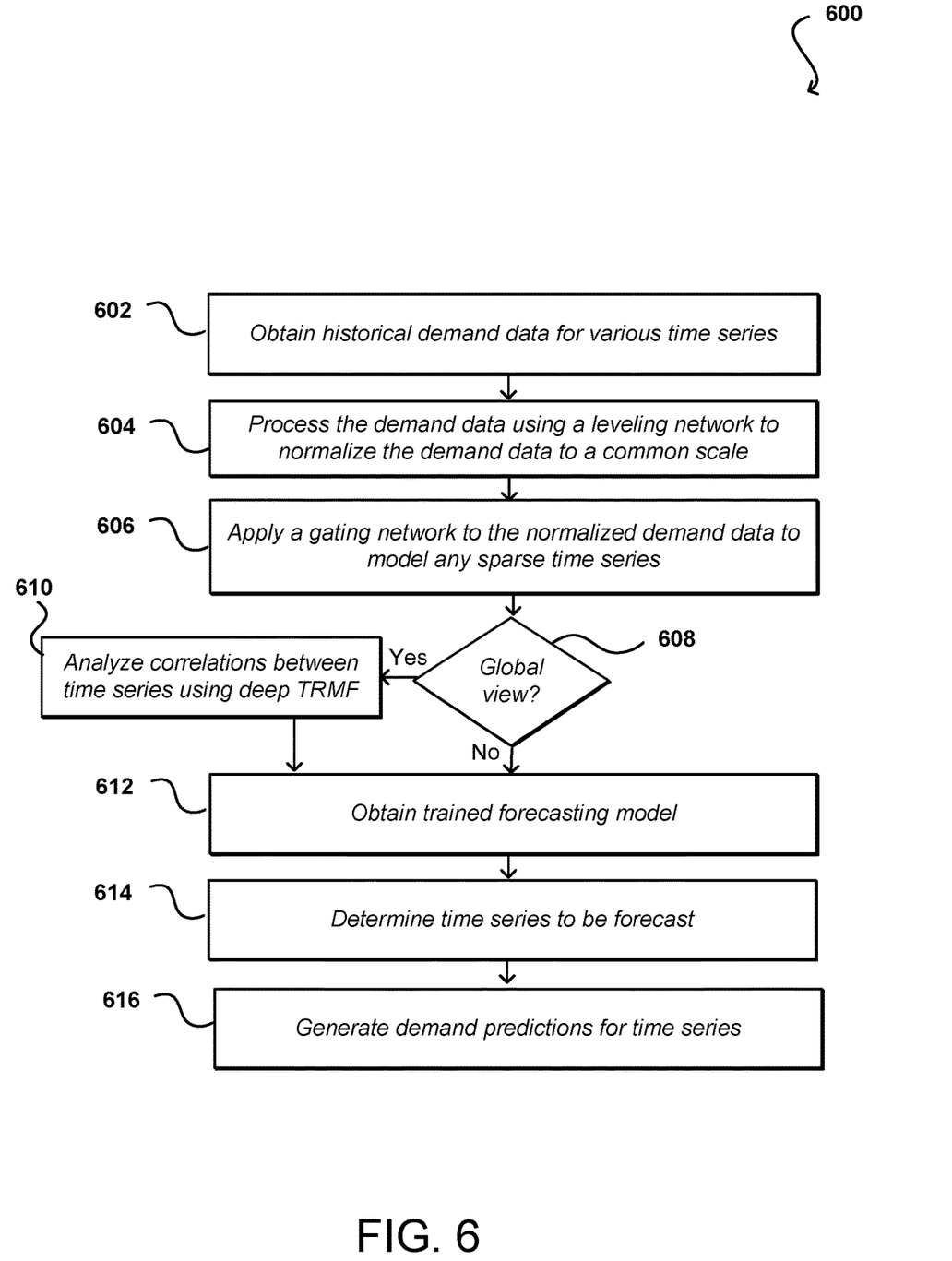
FIG. 6 illustrates an example process for generating demand forecasts that can be utilized in accordance with various embodiments.

FIG. 6 illustrates an example process 600 for determining forecast demand that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of training data is obtained 602 that includes historical demand data for various time series. As mentioned, the data set may be quite large due to the amount of time and number of items for which demand is being tracked or forecast. The demand data can be processed 604 using a leveling network to normalize the demand data to have a common scale. In some embodiments, the leveling can involve determining the mean value for an upcoming time window as well as the actual observations of a given time series, or the anticipated deviation from the mean. Once normalized, a gating network can be applied 606 to the normalized demand data to model any sparse time series in a non-zero manner. In some embodiments, the gating is based in part from a determined loss function. As mentioned, various variables may have insufficient data to provide for accurate forecasting, and the gating network can help to generate the predictions for these variables. A determination can be made 608 as to whether a global view or local view is to be obtained. If a global view is desired, correlations amongst the various time series can be analyzed 610 using deep temporally regularized matrix factorization (TRMF). The TRMF approach can take advantage of shared time series dynamics in the demand data. As a result of at least these steps, a trained forecasting model can be obtained 612. The model can be any appropriate temporal model as discussed herein, as may include a convolutional model or long short-term memory (LSTM)-based model, among other such options. The time series to be forecast can be determined 614, as well as information such as the period or session for the forecasting in some embodiments. One or more demand predictions can then be generated 616 for the time series using the trained model. The demand may take the form of a predicted session rate in some embodiments. As mentioned, the demand may be used for various applications, such as to rank auto-completion options, indicate anticipated demand for keywords in queries, predict demand for items to be purchased (or otherwise obtained in transactions) by customers, determine anticipated logistical demand, and the like. In some embodiments the training can be done continually in an online fashion, while in other embodiments the training can be done offline in a periodic manner, such as daily or weekly, among other such options.

Figure 7:
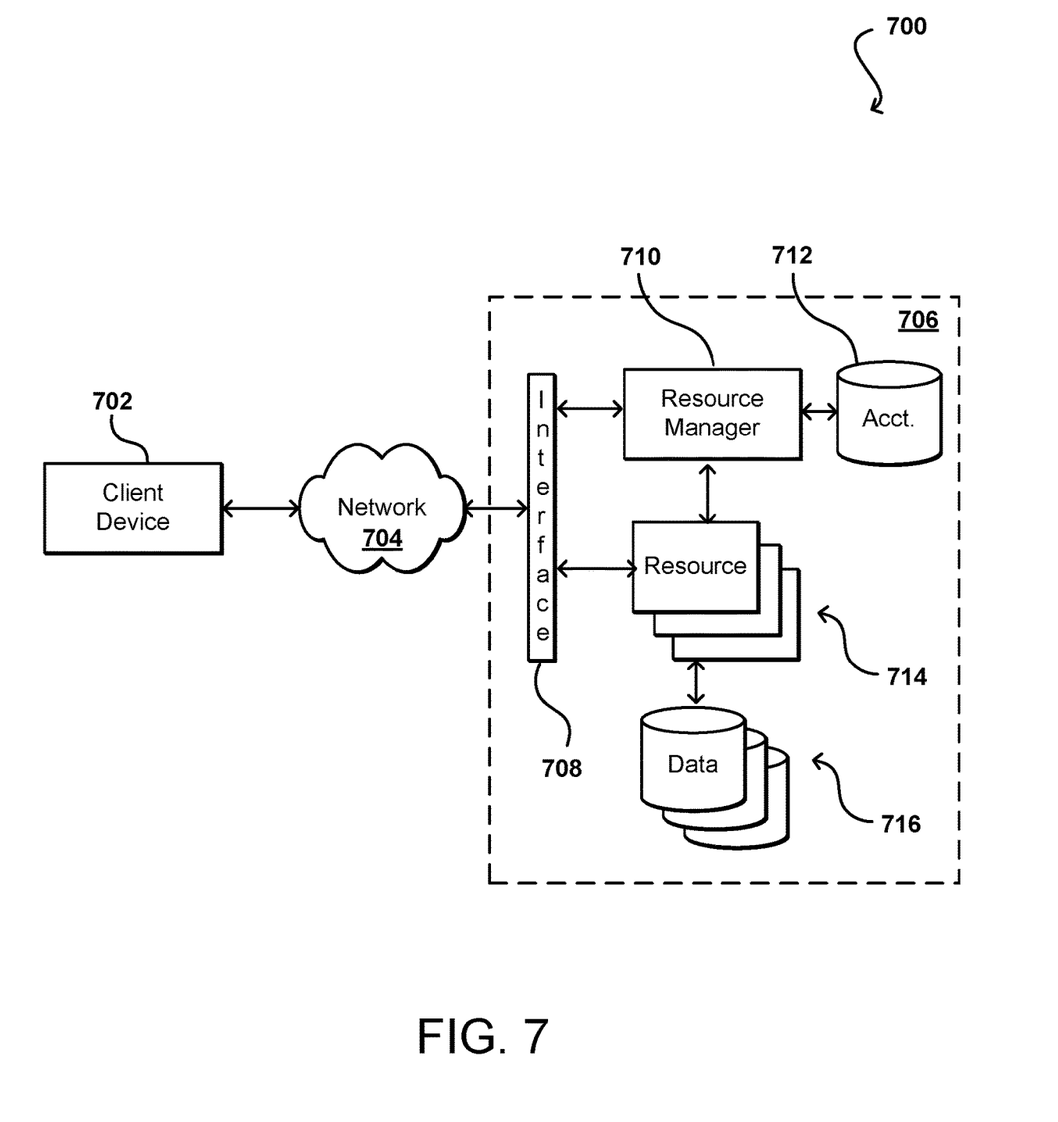
FIG. 7 illustrates an example system that can be used to implement aspects of the various embodiments.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Figure 8:
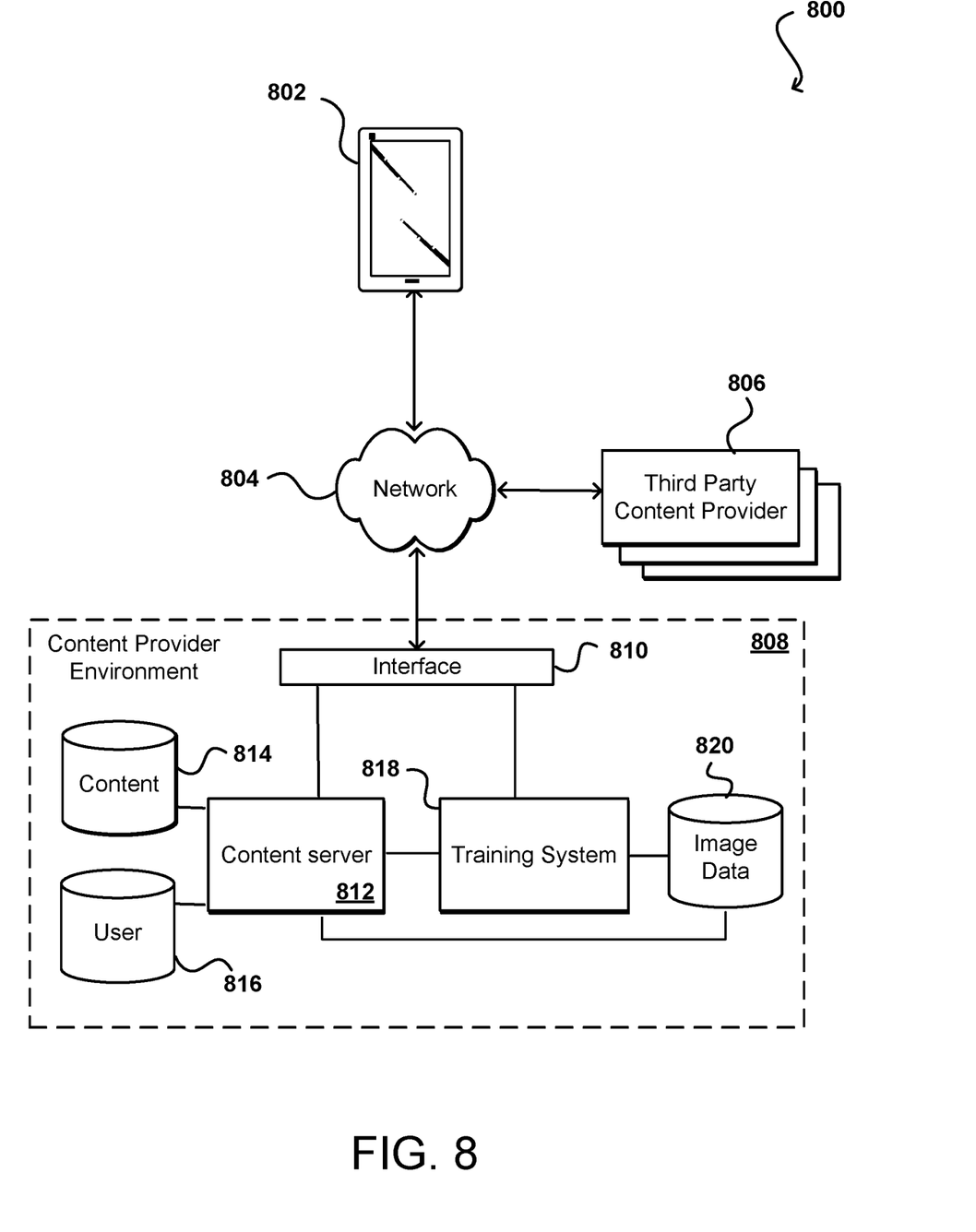
FIG. 8 illustrates another example system that can be used to implement aspects of the various embodiments.

FIG. 8 illustrates an example environment 800 that can be used to implement aspects in accordance with various embodiments. As mentioned elsewhere herein, various network training and data manipulation tasks can be performed on a client device or by a network service, among other such options. This example will utilize image analysis merely as an example. In FIG. 8, a client computing device 802 can submit a request for content across at least one network 804 to be received by a content provider environment 808. As mentioned, in at least some embodiments the request can include an input image, or query image, for which a user of the client computing device 802 wants to obtain classification or identification information, for example. Upon identifying an object represented in the image, it might also be desirable for the content provider environment to provide content relating to the identified object. The network(s) can include any appropriate network, such as the Internet, a local area network (LAN), a cellular network, an Ethernet, or other such wired and/or wireless network. The content provider environment 808 can include any appropriate resources for providing content from a resource provider, as may include various servers, data stores, and other such components known or used for providing content from across a network (or from the "cloud").

In this example, a call received to the content provider environment 808 can be received by an interface layer 810 of the environment. As known for network environments, the interface layer can include components such as interfaces (e.g., APIs), load balancers, request and/or data routers, and the like. If the request is a request for content, such as for content related to a query image, information for the request can be directed to one or more content servers 812, which can obtain the relevant content from a content data store 814 or other such repository to be sent back across the network(s) to the computing device. In some embodiments, information for the request might be compared against user data in a user data store 816 or other such location to determine, for example, whether the user has access rights to that content. In some cases, a call or request received to the content provider environment 808 might be from another entity, such as a third party content provider 806. As discussed previously, such providers may provide images and information to be displayed to users along with the served content. This content may relate to a specific item, product, or other such object associated with a product. At least some of these images can be used to train neural networks as discussed herein. In some embodiments the content provider network will call into such a third party system for the content.

The interface layer can determine the type of call or request and cause information to be forwarded to the appropriate component or sub-system. For example, training images can be stored to a data store 820 for use in training a neural network by a training system or service 818, with the resulting training sets being stored to the same or a different data store 820, or the content repository 814. When a request for content is received, the query image can be processed using a trained neural network in order to identify the object represented in the query image. In other embodiments, images having already been classified by the neural network might be stored to the image data repository 820 and then compared against the query image using a feature match process, among other such options. Once the identification is made, the identification information can be forwarded to the content server 812 which can pull the corresponding content from an appropriate data store 814 or 820 and returned to the client computing device 802. A similar approach can be used for sound or video, for example, where data from a trained neural network can be provided in response to receiving a classification in order to provide audio and/or video data.

Figure 9:
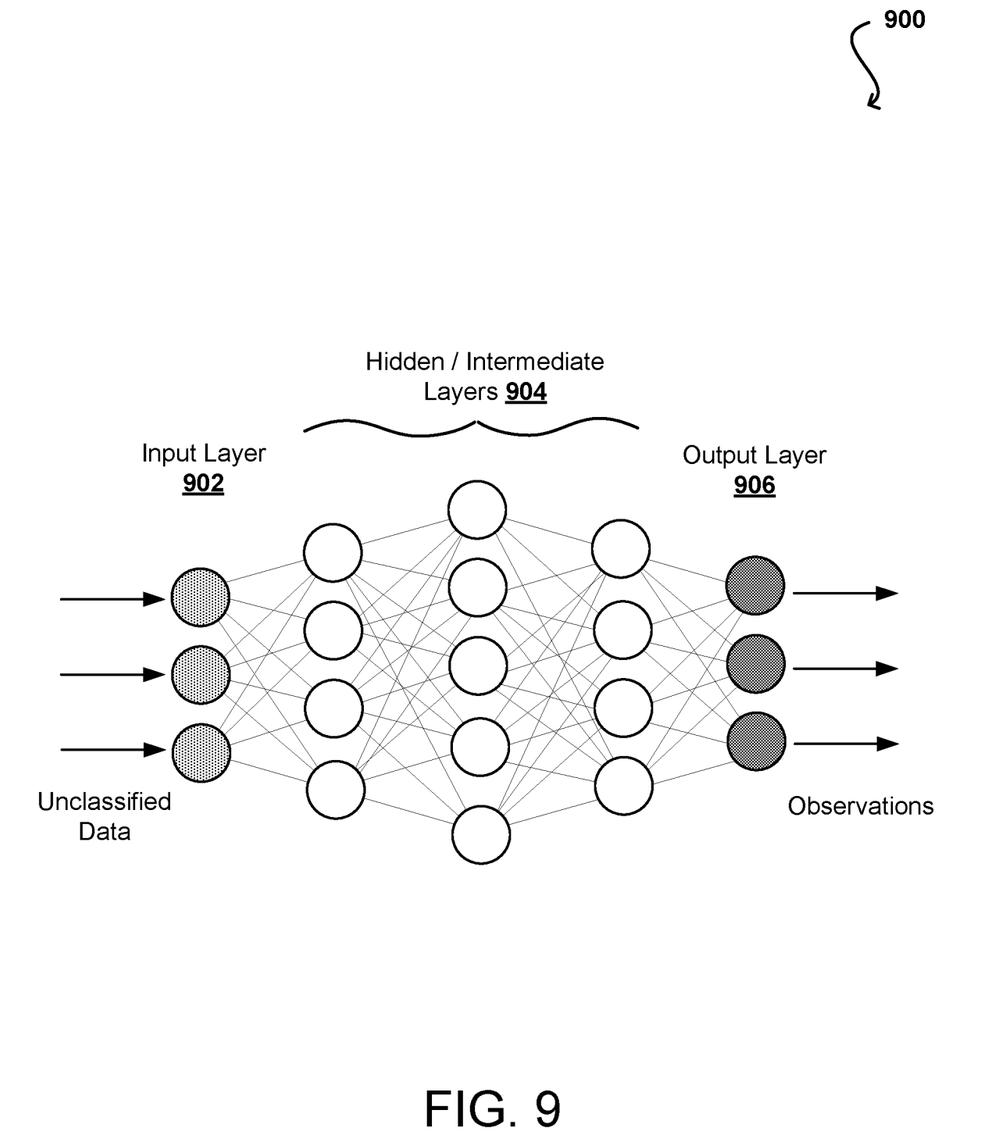
FIG. 9 illustrates layers of an example neural network that can be used to implement aspects of the various embodiments.

FIG. 9 illustrates an example statistical model 900 that can be utilized in accordance with various embodiments. In this example the statistical model is an artificial neural network (ANN) that includes a multiple layers of nodes, including an input layer 902, an output layer 906, and multiple layers 904 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 10:
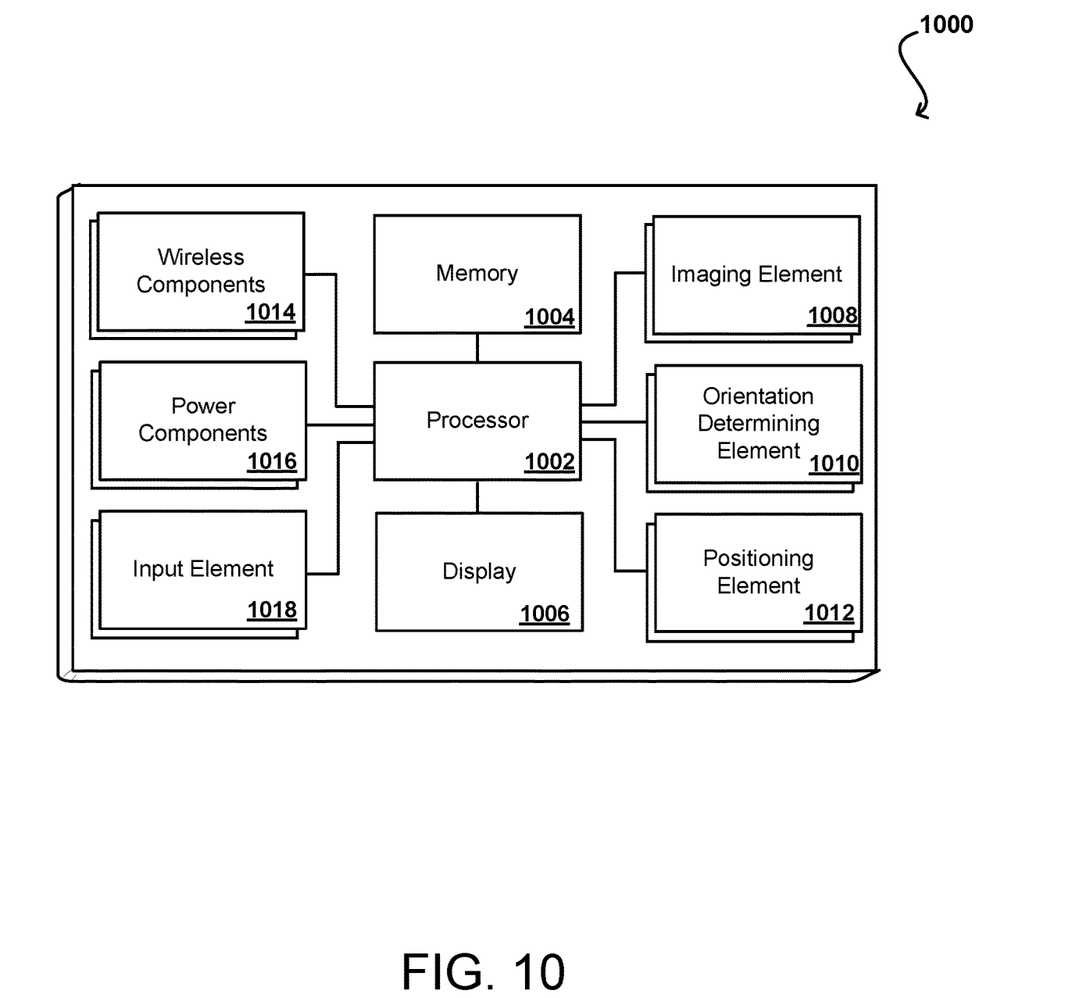
FIG. 10 illustrates example components of an example computing device that can be utilized in accordance with various embodiments.

FIG. 10 illustrates a set of basic components of an electronic computing device 1000 that can be utilized to implement aspects of the various embodiments. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices. The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining a set of training data including historical data for a set of queries;
    training a temporal model using the training data, the training including:
        processing the training data using a leveling network to provide normalization of the training data;
        processing at least one sparse time series of the set using a gating network; and
        analyzing correlations between two or more time series of the set using deep Temporally Regularized Matrix Factorization (TRMF) to determine common patterns in the training data;
    receiving a query prefix;
    processing, using the trained temporal model, the query prefix to determine a set of related queries and forecast demand values for an upcoming period of time; and
    providing, corresponding to the query prefix, a subset of the related queries having highest forecast demand values for suggestions to complete a query starting with the query prefix.

2. The computer-implemented method of claim 1, wherein the trained temporal model is a temporal convolutional network capable of modeling large scale time-series.

3. The computer-implemented method of claim 1, wherein the leveling network utilizes a scale-free leveling architecture providing diverse scaling of the training data for different time series.

4. The computer-implemented method of claim 1, further comprising:
    training the temporal model using a stochastic gradient descent (SGD) approach using mini-batches of the training data.

5. The computer-implemented method of claim 1, wherein the temporal model is a high-capacity long short-term memory (LSTM)-based model.

6. A computer-implemented method, comprising:
    obtaining a set of training data including historical demand data for a set of data series;
    training a temporal model using the training data, the training including:

processing the training data using a leveling network to provide normalization of the training data; and processing at least one sparse time series of the set using a gating network; and determining, using the trained temporal model, a forecast demand for an upcoming period of time, related queries to be suggested based in part on the forecast demand to complete a query starting with a query prefix comprising part of the related queries.

7. The computer-implemented method of claim 6, further comprising:

analyzing correlations between two or more of the time series of the set using deep Temporally Regularized Matrix Factorization (TRMF) to determine common patterns in the training data for use in the training of the temporal model.

8. The computer-implemented method of claim 6, further comprising:

training the temporal model using a stochastic gradient descent (SGD) approach using mini-batches of the training data.

9. The computer-implemented method of claim 6, wherein the temporal model is a temporal convolutional network capable of modeling large scale time-series.

10. The computer-implemented method of claim 6, wherein the leveling network utilizes a scale-free leveling network architecture providing diverse scaling of the training data for different time series.

11. The computer-implemented method of claim 6, wherein the historical demand data relates to demand for at least one of an item, a type of content, a type of hardware, a query, a keyword, a set of transactions, or logistical data.

12. The computer-implemented method of claim 6, wherein the temporal model is a high-capacity long short-term memory (LSTM)-based model.

13. The computer-implemented method of claim 6, wherein the temporal model is trained to account for non-linear temporal dependencies in the training data.

14. The computer-implemented method of claim 6, wherein the temporal model utilizes a causal convolutional architecture with dilation.

15. The computer-implemented method of claim 6, wherein the leveling network determines mean values and deviations for individual time series of the training data.

16. A system, comprising:

at least one processor; and memory storing instructions that, when executed by the at least one processor, cause the system to:

obtain a set of training data including historical demand data for a set of data series;

train a temporal model using the training data, including:

processing the training data using a leveling network to provide normalization of the training data; and processing at least one sparse time series of the set using a gating network; and determine, using the trained temporal model, a forecast demand for an upcoming period of time, related queries to be suggested based in part on the forecast demand to complete a query starting with a query prefix comprising part of the related queries.

17. The system of claim 16, wherein the instructions when executed further cause the system to:

analyze correlations between two or more of the time series of the set using deep Temporally Regularized Matrix Factorization (TRMF) to determine common patterns in the training data for use in the training of the convolutional model.

18. The system of claim 16, wherein the instructions when executed further cause the system to:

train the temporal model using a stochastic gradient descent (SGD) approach using mini-batches of the training data.

19. The system of claim 16, wherein the temporal model is a high-capacity long short-term memory (LSTM)-based model or a temporal convolutional network capable of modeling large scale time-series.

20. The system of claim 16, wherein the leveling network utilizes a scale-free leveling network architecture providing diverse scaling of the training data for different time series.

* * * * *